United States Patent
Kirk (10) Patent No.: US 10,476,683 B2
(45) Date of Patent: *Nov. 12, 2019

(54) METHODS AND SYSTEMS TO WIRELESSLY CONNECT TO A VEHICLE

(71) Applicant: Honeywell International Inc., Morris Plains, NJ (US)

(72) Inventor: James Christopher Kirk, Clarksville, MD (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/217,617

(22) Filed: Dec. 12, 2018

(65) Prior Publication Data

US 2019/0123918 A1   Apr. 25, 2019

Related U.S. Application Data

(63) Continuation of application No. 15/099,288, filed on Apr. 14, 2016, now Pat. No. 10,187,216.

(51) Int. Cl.
*H04L 9/00* (2006.01)
*H04L 9/32* (2006.01)
(Continued)

(52) U.S. Cl.
CPC .............. *H04L 12/06* (2013.01); *G06F 21/36* (2013.01); *G07C 5/0858* (2013.01); *H04L 63/08* (2013.01); *H04W 12/06* (2013.01)

(58) Field of Classification Search
CPC .................................. H04L 12/06; G06F 21/36
(Continued)

(56) References Cited

U.S. PATENT DOCUMENTS 8,391,615 B2  3/2013  Wu et al.
8,724,856 B1  5/2014  King
(Continued)

FOREIGN PATENT DOCUMENTS

WO    2015127203 A1   8/2015

OTHER PUBLICATIONS

European Patent Office, "Extended European Search Report from EP Application No. 17162918.1, dated Jun. 14, 2017", "from Foreign Counterpart of U.S. Appl. No. 15/099,288", filed Jun. 14, 2017, pp. 1-8.

*Primary Examiner* — Haresh N Patel
(74) *Attorney, Agent, or Firm* — Bookoff McAndrews, PLLC (57) ABSTRACT

A vehicle wireless connection system, the system comprising: at least one portable computing device (PCD), wherein the PCD includes: at least one camera, wherein the camera is configured to capture an image of a vehicle indicator on a vehicle to capture a vehicle indicator image; at least one memory including a certification data file having one or more authorization certificates; at least one PCD processor configured to receive the vehicle indicator image and execute a sign-on application, wherein the sign-on application is further configured to: compare the vehicle indicator image with one or more stored images; when the vehicle indicator image is the same as one of the one or more stored images, direct the PCD to connect to the vehicle; and when the authorization certificates are determined valid, connect the PCD to the vehicle at a wireless access point to provide access to some or all vehicle information.

20 Claims, 2 Drawing Sheets

(51) Int. Cl.
*H04L 12/06* (2006.01)
*G06F 21/36* (2013.01)
*H04W 12/06* (2009.01)
*G07C 5/08* (2006.01)
*H04L 29/06* (2006.01)

(58) Field of Classification Search
USPC .......................................................... 726/10
See application file for complete search history.

(56) References Cited

U.S. PATENT DOCUMENTS

| | | | |
|---|---|---|---|
| 2005/0173524 A1 | 8/2005 | Schrader | |
| 2008/0102824 A1* | 5/2008 | Kauffman | H04B 7/18506 455/431 |
| 2010/0241857 A1 | 9/2010 | Okude et al. | |
| 2011/0231310 A1* | 9/2011 | Roberts | G06F 21/316 705/40 |
| 2011/0249144 A1 | 10/2011 | Chang | |
| 2012/0254960 A1 | 10/2012 | Lortz et al. | |
| 2013/0143524 A1* | 6/2013 | Hjelm | H04W 8/205 455/410 |
| 2013/0150004 A1* | 6/2013 | Rosen | H04W 8/22 455/414.1 |
| 2014/0320645 A1* | 10/2014 | Schmitz | G08G 1/054 348/142 |
| 2015/0030214 A1* | 1/2015 | Fujiwara | G06F 21/32 382/118 |
| 2015/0038129 A1* | 2/2015 | Sundareswaran | H04L 41/0889 455/418 |
| 2015/0051756 A1* | 2/2015 | Owyang | B64C 19/00 701/3 |
| 2015/0223012 A1 | 8/2015 | Kakarala et al. | |
| 2015/0235106 A1* | 8/2015 | Kraeling | G06K 9/00791 382/190 |
| 2015/0382162 A1* | 12/2015 | Ireland | H04L 51/38 455/466 |
| 2016/0167581 A1* | 6/2016 | Beck | H04N 7/183 348/148 |
| 2016/0205724 A1* | 7/2016 | Shi | H04B 7/18506 370/254 |
| 2017/0302461 A1* | 10/2017 | Kirk | G06F 21/36 |

* cited by examiner

METHODS AND SYSTEMS TO WIRELESSLY CONNECT TO A VEHICLE

This patent application is a continuation of and claims the benefit of priority to U.S. Nonprovisional patent application Ser. No. 15/099,288, now U.S. Pat. No. 10,187,216, filed on Apr. 14, 2016, the entirety of which is incorporated herein by reference.

BACKGROUND

Aircrafts, typically, have built-in information (computer/avionics) systems for use by aircraft crew members and maintenance personnel. The tablet and laptop computer and smartphone explosion has caused airlines and original equipment manufacturers (OEM) to make use of such devices to sign into these avionic and maintenance systems on the aircraft. Aircraft crew members and maintenance personnel are permitted to sign onto aircraft information systems through a wireless interface and perform information transfers and vehicle maintenance using a portable computing device (PCD).

However, in the presence of multiple aircrafts on the same tarmac, a user may inadvertently sign onto the wrong wireless-equipped aircraft, and thus download from, or interact with the wrong aircraft. To reduce the likelihood of such errors, conventional systems generally require the user to select a connection facility, and enter a service set identifier (SSID) and a password corresponding to that connection facility. However, some erroneous logins may still occur when personnel are authorized to access multiple co-located aircraft.

SUMMARY

A vehicle wireless connection system is provided. The system comprises: at least one portable computing device (PCD), wherein the PCD includes: at least one camera, wherein the camera is configured to capture an image of a vehicle indicator on a vehicle to capture a vehicle indicator image; at least one memory including a certification data file having one or more authorization certificates; at least one PCD processor configured to receive the vehicle indicator image and execute a sign-on application, wherein the sign-on application is further configured to: compare the vehicle indicator image with one or more stored images; when the vehicle indicator image is the same as one of the one or more stored images, direct the PCD to connect to the vehicle; and when the authorization certificates are determined valid, connect the PCD to the vehicle at a wireless access point to provide access to some or all vehicle information.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

Embodiments of the present disclosure address the need to provide effective wireless access to vehicle information using portable electronic devices. Often, airport configurations include multiple aircrafts in immediate vicinity of each other. Because of the presence of multiple wireless access points, it is possible for an aircraft personnel (such as maintenance, pilot, or crew member) to mistakenly sign-in to the router of the wrong avionics system in an attempt to obtain information related to the aircraft. For example, a maintenance personnel may be responsible for performing checks on two aircrafts. The portable computing device of the maintenance personnel may be within range of the wireless access points of both aircrafts. The maintenance personnel may be signed on to the access point of the first aircraft while performing checks on the first aircraft. When the maintenance personnel proceeds to perform checks on the second aircraft, the portable computing device may automatically connect to the access point and maintenance system of the first aircraft since the portable computing device is within the range of the access point of the first aircraft. Further, exemplary embodiments described herein significantly speed up the process of signing onto a vehicle system, while insuring that the portable computing device is connected to the correct aircraft by providing an application for the PCD that automatically connects the PCD with the vehicle.

In the exemplary embodiments described herein, a portable computing device (PCD) captures an image of a vehicle indicator. The image of the vehicle indicator is compared with one or more images that were previously stored. Each of the stored images correspond to sign on credentials for a respective vehicle. When the image of the vehicle indicator matches the stored image, the PCD is connected to a wireless access point of the respective vehicle associated with the stored image and given access to certain information about the respective vehicle. In exemplary embodiments described herein, the wireless access point complies with one of the following wireless standards: Wi-Fi, cellular phone number or Zigby. In exemplary embodiments, the wireless access point complies with any other appropriate means of wireless data transport.

Figure 1:
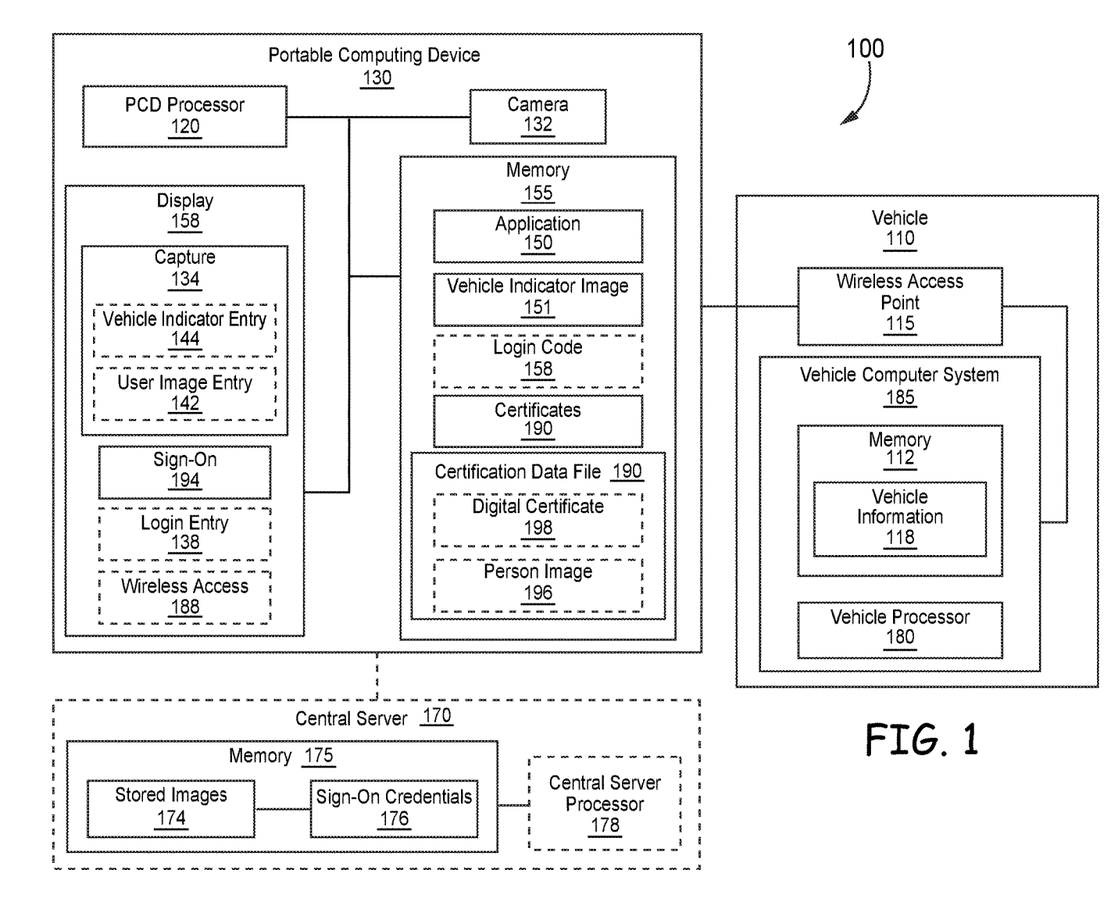
FIG. 1 is an example of a vehicle wireless connection system according to one embodiment of the present disclosure.

FIG. 1 is an example of a vehicle sign-on system 100 including at least one portable computing device (PCD) 130. PCD 130 includes a camera 132 and at least one application 150 that uses the camera 132 to capture a vehicle indicator image 151. In exemplary embodiments, PCD 130 could be a smartphone, a tablet, or any other portable electronic device (PED).

In exemplary embodiments, application 150 is stored in memory 155 and executed in at least one processor 120. In exemplary embodiments, the at least one processor 120 implements at least some of the processing described herein. In exemplary embodiments, the at least one processor 120 includes at least one programmable processor, such as a microprocessor, a microcontroller, an application-specific integrated circuit (ASIC), a field-programmable gate array (FPGA), a field-programmable object array (FPOA), or a programmable logic device (PLD). The at least one processor 120 described above may include or function with software programs, firmware or other computer readable instructions for carrying out various methods, process tasks, calculations, and control functions, described herein. These instructions are typically stored on any appropriate computer readable medium used for storage of computer readable instructions or data structures, such as memory 155. The computer readable medium can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

In exemplary embodiments, PCD 130 further includes certification data file 190 that includes one or more authorization certificates. Certification data file 190 is used for identifying PCD 130 and/or the role of the PCD user using PCD 130 in order to provide access to application 150. Contents of certification data file 190 may include images (such as person image 196) and/or digital certificate(s) 198. Person image 196 may be used to grant access based on, for example, facial recognition. Digital certificate(s) 198 may include but are not limited to version, holder, issuer, serial number, validity period, and attributes. In exemplary embodiments, certification data file 190 is pre-loaded on PCD 130 prior to use of the PCD. In exemplary embodiments, a PCD user loads certification data file 190 on PCD 130 when running application 150 on PCD 130 for the first time. In exemplary embodiments, certification data file 190 can be used to verify access, identity, permissions, etc. In exemplary embodiments, digital certificate(s) 198 may be a public key infrastructure (PKI) certificate.

Application 150 further includes a display 158 visible to a PCD user. Application 150 displays at least a sign-on button 194 on display 158. When sign-on button 194 is selected (e.g., by touching the region of display 158 containing sign-on button 194), vehicle indicator image 151 is compared with stored images 174. In exemplary embodiments, application 150 further causes camera 132 to capture an image within the view of camera 132 when sign-on button 194 is selected. That is, in such examples, the PCD user aims the camera at the vehicle indicator and selects the sign-on button 194. Upon selecting the sign-on button 194, an image of the vehicle indicator is captured by camera 132 and a vehicle indicator image 151 is generated and stored in memory 155. This vehicle indicator image 151 is then compared with stored images 174 to gain access to sign-on credentials 176 (such as SSID, password, etc.) and connect PCD 130 with wireless access point 115 of vehicle 110.

In exemplary embodiments, application 150 causes a capture button to be displayed on display 158. In such an embodiment, when capture button 134 is selected, application 150 causes camera 132 to capture a vehicle indicator image 151. In this embodiment, after vehicle indicator image 151 has been captured, the sign-on button 194 can be selected to gain access to sign-on credentials 176 of vehicle 110 and connect to wireless access point 115 of vehicle 110.

In exemplary embodiments, when the capture button 134 is selected, application 150 causes at least one of a vehicle indicator entry button 144 and user image entry 142 to be displayed on display 158. When a vehicle indicator entry button 144 is selected, application 150 causes camera 132 to capture a vehicle indicator image 151, and a sign-on button 194 can be selected to gain access to sign-on credentials 176 of vehicle 110. When a user image entry button 142 is selected, application 150 causes camera 132 to capture a person image 196 and saves it in memory 155 as a certification data file 190.

In exemplary embodiments, when the capture button 134 is selected, application 150 causes camera 132 to capture an image. After the image is captured, application 150 causes a vehicle indicator entry button 144 and/or a user image entry button 142 to be displayed on display 158. Vehicle indicator entry button 144 can be selected to designate the image captured by camera 132 as vehicle indicator image 151. User image entry button 142 can be selected to designate the image captured by camera 132 as person image 196 and is saved as a certification data file 190 in memory 155.

In exemplary embodiments, application 150 causes a sign-on button 194 to be displayed on display 158 after a vehicle indicator image entry button 144 is selected. The sign-on button 194 can be selected to gain access to sign-on credentials 176 of vehicle 110 and connect to wireless access point 115 of vehicle 110.

Vehicle indicator image 151 is an image that has been captured of a vehicle indicator on vehicle 110. In exemplary embodiments, the vehicle indicator is any symbol, character or number that identifies vehicle 110, the vehicle that the PCD user using PCD 130 is trying to connect to. In exemplary embodiments, the vehicle indicator is a symbol, character or number that identifies the role of the user of PCD 130 attempting to obtain access. In exemplary embodiments, the vehicle indicator may be a sticker, painting or an applique disposed on a surface of vehicle 110. The surface of vehicle 110 including the vehicle indicator may be either interior or exterior of the vehicle 110. In exemplary embodiments, the vehicle indicator may be disposed on more than one location in vehicle 110. In exemplary embodiments, the vehicle indicator includes an optical character recognition symbol (such as the ones found on airline boarding passes), a bar code, an aircraft tail number or any unique symbol, character or number.

In exemplary embodiments, vehicle indicator image 151 is stored in an application memory 155 by application 150 for later retrieval. For example, if PCD 130 is disconnected from the system of vehicle 110, the user may be able to reconnect PCD 130 to vehicle 110 without having to recapture the vehicle indicator image 151.

PCD 130 further includes a PCD processor 120. After an image 151 of the vehicle indicator is captured, the vehicle indicator image 151 is sent to a PCD processor 120 through selection of sign-on button 194. PCD processor 120 receives vehicle indicator image 151 and a database including one or more stored images 174. The database is included in a memory 175 and each of the stored images 174 is associated with sign-on credentials 176 (such as SSID, password, etc.) for a respective vehicle and/or role of a respective PCD user. In exemplary embodiments, memory 175 is included in PCD 130 and coupled with PCD processor 120. PCD processor 120 compares the vehicle indicator image 151 with stored images 174. When the vehicle indicator image 151 is the same as one of the stored images 174, PCD 130 accesses the sign-on credentials 176 associated with the respective stored image 174 and uses these credentials 176 to direct an automated sign-on without a need for data entry by the PCD user.

In exemplary embodiments, application 150 causes a login entry 138 to be displayed on display 158. In such an embodiment, the PCD user inputs a login code 158 into login entry 138. Login code 158 is entered into login entry 138 using an input device (such as keyboard, keys on touch screen of PCD, etc.). Application 150 is able to identify the role of the PCD user based on the login code 158 entered. In such an embodiment, PCD processor 120 compares the vehicle indicator image 151 with a database of stored images 174, wherein the database of stored images 174 includes only the stored images that are accessible by the PCD user identified using the login code 158. In exemplary embodiments, login code 158 is stored in memory 155.

Stored images 174 include symbols, characters and numbers for one or more vehicles, each stored image associated with sign-on credentials 176 for a respective vehicle and/or role of a respective PCD user. The database of stored images can be set up and maintained by a vehicle manufacturer, an operator (such as an airline) or a third party. In exemplary embodiments, the database of stored images 174 is pre-loaded and/or updated on PCD 130 prior to running application 150.

In exemplary embodiments, memory 175, database of stored images 174 and sign-on credentials 176 are stored on a central server 170 that is accessible by PCD 130. Central server 170 can be maintained by vehicle operator (such as an airline), an OEM (such as a vehicle manufacturer) or a third party that provides a service to the operator or the OEM. Central server 170 is coupled with application 150 and includes a memory 175 that stores stored images 174 and sign-on credentials 176. In exemplary embodiments, upon selecting sign-on button 194, central server 170 sends the database of stored images 174 and the corresponding sign-on credentials 176 to application 150. PCD processor 130 performs comparison of vehicle indicator image 151 with stored images 174. When vehicle indicator image 151 is the same as one of the stored images 174, PCD 130 accesses sign-on credentials 176 associated with the respective stored image 174 and uses these credentials 176 to direct an automated sign-on without a need for data entry by the PCD user.

In exemplary embodiments, upon selecting sign-on button 194, application 150 sends vehicle indicator image 151 to central server 170 and central server 170 performs comparison of vehicle indicator image 151 with stored images 174 using a central server processor 178 that is included in central server 170. In such an example, central server processor 178 is coupled to memory 175. When vehicle indicator image 151 is the same as one of the stored images 174, processor 178 directs central server 170 to send the sign-on credentials 176 associated with the respective stored image 174 to PCD 130. PCD 130 uses these credentials 176 to direct an automated sign-on without a need for data entry by the PCD user to connect to vehicle 110 at wireless access point 115.

In exemplary embodiments, one or more certificates in certification data file 190 of PCD 130 are received by central server 170, and after determining which stored image 174 is the same as vehicle indicator image 151, central server processor 178 determines if one or more certificates in certification data file 190 are valid for connection to vehicle 110, wherein vehicle 110 is the vehicle associated with matched stored image 174. In exemplary embodiments, central server is configured to store facial images. In one such embodiment, when the certificate in the certification data file 190 received by the central server is a person image 196, the central server processor 178 compares it with the stored facial images to determine if the certificate is valid and if the user in the received person image 196 is authorized to have access to sign-on credentials 176 for wireless access point 115 of vehicle 110.

In exemplary embodiments, login code 158 is received by central server 170, and central server processor 178 retrieves stored images 174 from memory 175 based on login code 158. That is, central server processor 178 identifies the role of the PCD user based on login code entered, retrieves from the database of stored images 174 in memory 175 the stored images that are accessible by the PCD user identified using the login code 158, and compares the retrieved stored images with vehicle indicator image 151. In exemplary embodiments, central server 170 is wirelessly coupled to PCD 130. In further exemplary embodiments, central server 170 is connected to PCD 130 using a cellular wireless network. In exemplary embodiments, central server 170 provides certification data file 190 to the PCD 130 based on the login code 158 and/or the vehicle indicator image 151.

In one embodiment, the vehicle indicator identifies vehicle 110 that PCD 130 is attempting to connect with as well as the role of the PCD user attempting to access information of vehicle 110. Thus, in exemplary embodiments, the sign-on credentials 176 associated to the stored image may be a role specific assignment. For example, a vehicle indicator may be a number associated with a pilot of a particular aircraft. This number may be located on a pilot seat within the cockpit of the particular aircraft. Thus, when using this number as the vehicle indicator, application 150 will connect to vehicle 110 as a pilot, providing user of PCD 130 access to pilot related information such as weather, fuel of the aircraft, etc.

A PCD user is anyone who uses a PCD and may desire access to vehicle information. The PCD user must have authorization to connect to a given wireless access point of a vehicle and access vehicle information. In exemplary embodiments, when the vehicle is an aircraft, a PCD user may include pilots, flight attendants, other airline crew, technical crew (such as engineers), maintenance personnel, vendors or any person dealing with logistics, maintenance or control of the vehicle. In exemplary embodiments, a PCD user may include passengers of an airline. For example, when a PCD user is a passenger, a vehicle indicator may be a symbol located on the back of a passenger seat. The passenger is directed to use application 150 to capture an image of a vehicle indicator to activate and connect to a wireless access point of vehicle 110.

In exemplary embodiments, a single vehicle indicator may be used by PCD users in different roles requiring different vehicle information. In such examples, PCD 130 may be connected to vehicle 110 in a role specific capacity based on login code 158. For example, a vehicle indicator may be an aircraft tail number that may be used by crew members and maintenance personnel. Maintenance personnel may require access to aircraft information such as brake checks, fuel levels, etc. whereas the crew member (such as a lead flight attendant) of the aircraft may require access to information regarding duty free items, drinks, snacks, etc. available onboard. When the lead flight attendant enters login code 158, the role of the lead flight attendant is identified by application 150, the image of the aircraft tail number is compared with stored images 174 to identify the aircraft, and the sign-on credentials 176 associated with the image of the aircraft tail number are provided to application 150. Application 150 then connects PCD 130 to wireless access point 115 of vehicle 110 and has access to vehicle information 118, vehicle information 118 pertaining to role of the PCD user. Thus, in the given example, vehicle information 118 includes information regarding availability of duty free items, drinks, snacks, etc. onboard.

In exemplary embodiments, vehicle 110 may have a plurality of wireless access point(s) 115. In exemplary embodiments, each wireless access point 115 may be accessible based on the role of the user of PCD 130. In such embodiments, upon selecting the sign-on button 194, application 150 automatically connects PCD 130 to a given wireless access point 115 of vehicle 110 pertaining to role of the PCD user.

In some embodiments, a PCD user may have access to one or more of the at least one wireless access point(s) 115. For example, a maintenance personnel may have access to wireless access point for maintenance personnel, wireless access point for pilot and/or flight crew, and wireless access point for passenger. In such an embodiment, after the sign-on credentials 176 have been received by PCD 130, application 150 causes one or more wireless access buttons 188 to be displayed on display 158 to provide the PCD user an option to sign-on to a different wireless access point 115 on vehicle 110. Selecting the wireless access button 188 automatically connects the PCD user to the selected wireless access point 115 on vehicle 110.

After vehicle indicator image 151 is compared with stored images 174, and PCD 130 has received access to sign-on credentials 176, application 150 uses these credentials to direct an automated sign-on to connect to wireless access point 115 in vehicle 110. In exemplary embodiments, wireless access point 115 includes a router. After connecting to wireless access point 115, a user using PCD 130 has access to some or all of vehicle information 118.

Vehicle information 118 may be stored in a memory 112 of vehicle 110. Vehicle 110 may include a vehicle computer system 185 that includes memory 113 and a vehicle processor 180. In exemplary embodiments, at wireless access point 115, vehicle 110 receives certification data file 190 and sign-on credentials 176 from PCD 130. Vehicle processor 180 determines whether one or more certificates in certification data file 190 received from PCD 130 are valid. If one or more certificates in certification data file 190 are determined valid, PCD 130 is given access to some or all of vehicle information 118. In exemplary embodiments, login code 158 entered may also be received by vehicle 110, and based on login code 158, vehicle processor 180 determines the role of the PCD user and provides access to vehicle information 118 pertaining to the role of the PCD user.

In exemplary embodiments, before connecting, a certification data file 190 is exchanged with vehicle 110, and vehicle 110 determines if the authorization certification data file 190 is valid. In exemplary embodiments, vehicle 110 determines the specific role assigned to the authorization certification data file 190 before providing access to some or all of vehicle information 118. In exemplary embodiments, the vehicle computer system 185 stores facial images of a person (such as a PCD user). In exemplary embodiments, when the authorization certificate included in the certification data file 190 received by the central server is a person image 196, the vehicle processor 180 compares it with the stored facial images to determine if the certificate is valid and if the user in the received person image 196 is authorized to have access to some or all of vehicle information 118. In exemplary embodiments, when the certification data file 190 is person image 196, vehicle 110 uses a facial recognition system to identify the PCD user and determine if the PCD is authorized access to some or all of vehicle information 118. In exemplary embodiments, PCD 130 may limit access to application 150 by requiring a password to be entered.

Figure 2:
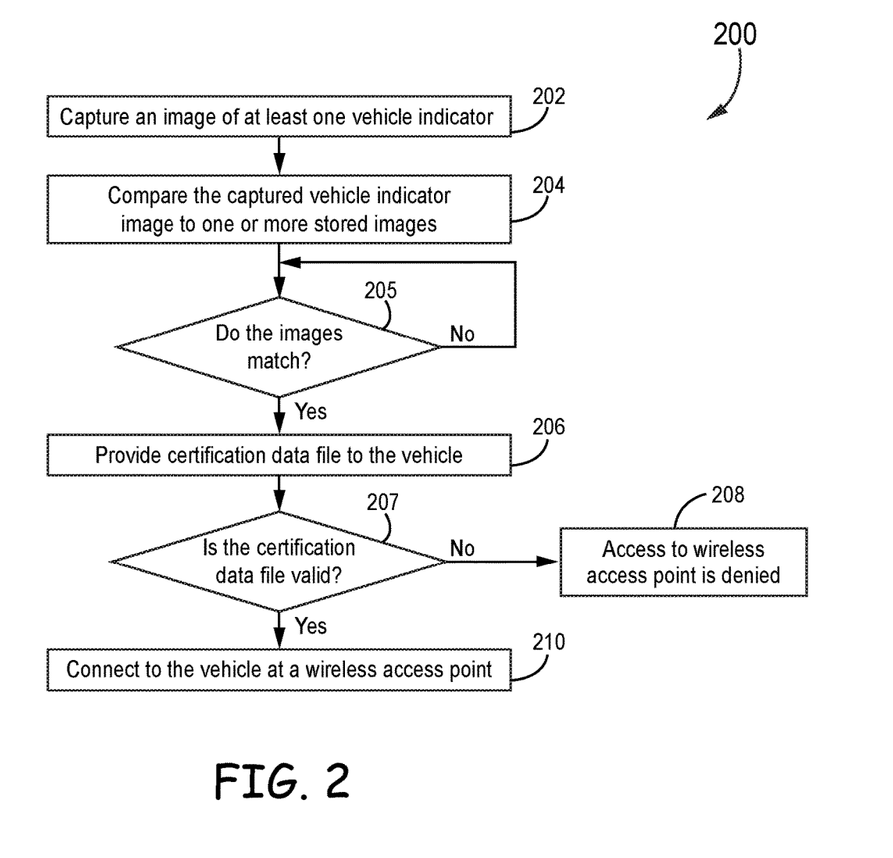
FIG. 2 is a flow diagram showing an exemplary method used for connecting to a vehicle system according to one embodiment of the present disclosure.

FIG. 2 is a flow diagram showing exemplary method used for connecting to a vehicle system. As discussed herein, method 200 of FIG. 2 is described with respect to examples of vehicle wireless sign-on system shown in FIG. 1. Method 200 shows an exemplary process from perspective of a portable computing device (PCD).

Method 200 begins at block 202 with capturing an image of at least one vehicle indicator. In one embodiment, the image is captured using a camera, such as camera 132. In exemplary embodiments, the vehicle indicator is any symbol, character or number that identifies a vehicle, such as the vehicle 110. In exemplary embodiments, the vehicle indicator is a symbol, character or number that identifies the role of the user of a PCD, such as PCD 130. In exemplary embodiments, the vehicle indicator may be a sticker, painting or an applique. In exemplary embodiments, the vehicle indicator includes an optical character recognition symbol (such as the ones found on airline boarding passes), a bar code, an aircraft tail number or any unique symbol, character or number. In exemplary embodiments, the image of the vehicle indicator is stored in a memory, such as memory 155 of PCD 130.

Method 200 then proceeds to block 204 with sending the captured vehicle indicator image to a processor to compare the captured vehicle indicator image to one or more stored images. In one embodiment, comparing the captured vehicle indicator image includes providing a processor, such as a processor 120 to receive the vehicle indicator image, receive one or more stored images; and compare the vehicle indicator image to the one or more stored images. In an exemplary embodiment, one or more stored images are received from a central server, such as central server 170. In exemplary embodiments, vehicle indicator image is sent to a central server, such as a central server 170, wherein the central server compares the vehicle indicator image to one or more stored images in the central server and determines if the vehicle indicator image matches the stored image.

Method 200 proceeds to block 205 with determining if the vehicle indicator image matches the stored image. When vehicle indicator does not match the stored image, method 200 proceeds back to block 204 and compares the next stored image with the vehicle indicator image. When one of the one or more stored images matches the vehicle indicator image, method 200 proceeds to block 206 with providing a certification data file, such as certification data file 190, to the vehicle to determine validity of the certification data file.

In exemplary embodiments, the certification data file 190 has one or more authorization certificates that are pre-loaded on PCD 130 prior to use of the application 150 by the user. Contents of certification data file 190 may include images (such as person image 196) and/or digital certificate(s) 198. In exemplary embodiments, certification data file 190 can be used to verify access, identity, permissions, etc. In exemplary embodiments, digital certificate(s) 198 may be a public key infrastructure (PKI) certificate. In exemplary embodiments, a user loads certification data file 190 on PCD 130 when operating application 150 on PCD 130 for the first time. In exemplary embodiments, the one or more authorization certificates are provided to a central server, such as a central server 170, that is configured to determine validity of the one or more authorization certificates in the certification data file.

Method 200 proceeds to block 207 with determining if the certification data file is valid. When the certification data file is not valid, method 200 proceeds to block 208 and access to the wireless access point on the vehicle is denied. When the certification data file is determined to be valid, method 200 proceeds to block 210 with connecting to a wireless access point on the vehicle, such as wireless access point 115 on vehicle 110. The wireless access point complies with one of the following standards: Wi-Fi, cellular phone number, Zigby, or any other means of wireless data transport. After connecting to the vehicle, PCD 130 has access to vehicle information, such as vehicle information 118.

EXAMPLE EMBODIMENTS

Example 1 includes a vehicle wireless connection system, the system comprising: at least one portable computing device (PCD), wherein the PCD includes: at least one camera, wherein the camera is configured to capture an image of a vehicle indicator on a vehicle to capture a vehicle indicator image; at least one memory including a certification data file having one or more authorization certificates; at least one PCD processor configured to receive the vehicle indicator image and execute a sign-on application, wherein the sign-on application is further configured to: compare the vehicle indicator image with one or more stored images; when the vehicle indicator image is the same as one of the one or more stored images, direct the PCD to connect to the vehicle; and when the one or more authorization certificates are determined valid, connect the PCD to the vehicle at a wireless access point to provide access to some or all vehicle information.

Example 2 includes the vehicle wireless connection system of Example 1, wherein the vehicle is an aircraft.

Example 3 includes the vehicle wireless connection system of any of Examples 1-2, wherein the wireless access point complies with one of the following standards: Wi-Fi, a cellular phone number and Zigby.

Example 4 includes the vehicle wireless connection system of any of Examples 1-3, wherein the vehicle indicator further comprises at least one of a symbol, a character, or a number.

Example 5 includes the vehicle wireless connection system of any of Examples 1-4, wherein the vehicle indicator further comprises an optical character recognition symbol, a barcode, and an aircraft tail number.

Example 6 includes the vehicle wireless connection system of any of Examples 1-5, wherein the sign-on application is further configured to include a display, wherein the display includes at least one sign-on button, wherein when the sign-on button is selected, the vehicle sign-on application is configured to: compare the vehicle indicator image with one or more stored images; when the vehicle indicator image is the same as one of the one or more stored images, direct the PCD to connect to the vehicle; and when the one or more authorization certificates are determined valid, connect the PCD to the vehicle at a wireless access point to provide access to some or all vehicle information.

Example 7 includes the vehicle wireless connection system of any of Example 6, wherein the display further includes at least one capture button coupled to the camera, wherein when selected, the capture button is configured to capture a vehicle indicator image.

Example 8 includes the vehicle wireless connection system of any of Examples 1-7, wherein the one or more authorization certificates further comprises a person image, and wherein when the person image is determined valid by at least one of a vehicle computer system of the vehicle or a central server, the sign-on application is configured to connect the PCD to the vehicle at a wireless access point to provide access to some or all vehicle information.

Example 9 includes the vehicle wireless connection system of any of Examples 1-8, wherein vehicle sign-on application further comprises a login code button, wherein when the login code button is selected and a login code is entered, the PCD processor is configured to compare the vehicle indicator image to the stored images corresponding to a role identified by the login code.

Example 10 includes the vehicle wireless connection system of any of Examples 1-9, further comprising a central server, wherein the central server includes a memory that includes the one or more stored images, and wherein the central server is accessible to the PCD using the sign-on application.

Example 11 includes the vehicle wireless connection system of Example 10, wherein the central server includes a central server processor, and wherein the central server processor is configured to: receive the vehicle indicator image from the PCD; retrieve the one or more stored images; compare the vehicle indicator image with the one or more stored images; and when the vehicle indicator image is the same as one of the one or more stored images, provide the sign-on application access to sign-on credentials associated with matched stored image.

Example 12 includes the vehicle wireless connection system of any of Examples 10 and 11, wherein vehicle sign-on application further comprises a login code button, wherein when the login code button is selected and a login code is entered, the central server processor is configured to retrieve the one or more stored images corresponding to role identified by the login code.

Example 13 includes a method for wirelessly connecting a portable computing device (PCD) to a vehicle, the method comprising: capturing an image of at least one vehicle indicator in an application of the PCD; sending the captured vehicle indicator image to a processor to compare the captured vehicle indicator image to one or more stored images; when one of the one or more stored images matches the vehicle indicator image, providing a certification data file to the vehicle to determine validity of one or more authorization certificates in the certification data file; and when the one or more authorization certificates in the certification data file are determined valid, connecting to the vehicle at a wireless access point.

Example 14 includes the method of Example 13, wherein sending captured vehicle indicator image to a processor further comprises identifying a role of a user using the PCD by processing a login code input into the application of the PCD.

Example 15 includes the method of any of Examples 13-14, further comprising providing the one or more authorization certificates of the certification data file to a central server, wherein the central server is configured to determine validity of the one or more certificates in the certification data file.

Example 16 includes the method of any of Examples 13-15, wherein sending the captured vehicle indicator image to a processor further comprises causing the processor in the PCD to: receive the vehicle indicator image; receive the one or more stored images; and compare the vehicle indicator image to the one or more stored images.

Example 17 includes the method of any of Examples 13-16, wherein at least one of the one or more authorization certificates in the certification data file is facial image of a person.

Example 18 includes the method of any of Examples 13-17, wherein providing certification data file to the vehicle to determine validity of the certification data file further comprises loading the certification data file on the PCD.

Example 19 includes a program product for implementing a mobile application on a portable computing device (PCD), tangibly stored on a non-transitory storage medium, comprising instructions operable to cause at least one programmable processor in the PCD to: capture a vehicle indicator image of at least one vehicle indicator in a vehicle; compare captured vehicle indicator image to one or more stored images; when one of the one or more stored images matches the vehicle indicator image, provide certification data file to the vehicle to determine validity of the certificate; and when the certification data file is determined valid, connect the PCD to the vehicle at a wireless access point.

Example 20 includes the program product of Example 19, further comprising instructions to: store vehicle indicator image in a memory of the PCD.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A computer-implemented method for wirelessly connecting a computing device to a vehicle, the method comprising:
   receiving a captured image of a vehicle indicator from the computing device;
   comparing the captured image of the vehicle indicator with one or more stored images of known vehicle indicators; and
   when the vehicle indicator of the captured image is the same as or matches one of the known vehicle indicators of the one or more stored images, directing the computing device to connect to a wireless access point of the vehicle to obtain access to some or all vehicle information at the computing device.

2. The computer-implemented method of claim 1, further comprising:
   receiving a login code from the computing device;
   identifying a role of a user using the computing device based on the received login code; and
   retrieving only one or more stored images of known vehicles indicators accessible by the user based on the identified role of the user.

3. The computer-implemented method of claim 2, wherein the comparing the captured image of the vehicle indicator with one or more stored images of known vehicle indicators includes:
   comparing the captured image of the vehicle indicator with only the one or more stored images of known vehicle indicators accessible by the user.

4. The computer-implemented method of claim 3, wherein the directing the computing device to connect to a wireless access point of the vehicle to obtain access to some or all vehicle information at the computing device includes:
   directing the computing device to connect to a wireless access point of the vehicle to obtain access to only some vehicle information at the computing device based on the identified role of the user.

5. The computer-implemented method of claim 1, further comprising:
   receiving a certification data file from the computing device;
   determining if one or more authorization certificates in the received certification data file are valid for connection to the vehicle; and
   if the one or more authorization certificates in the received certification data file are valid for connection to the vehicle, transmitting sign-on credentials to the computing device to direct the computing device to connect to the wireless access point of the vehicle to obtain access to some or all vehicle information at the computing device.

6. The computer-implemented method of claim 5, wherein at least one of the one or more authorization certificates in the received certification data file is a facial image of a person.

7. The computer-implemented method of claim 6, wherein the determining if the one or more authorization certificates in the received certification data file are valid for connection to the vehicle includes:
   comparing the facial image of the person in the received certification data file with one or more stored facial images; and
   when the facial image of the person in the received certification data file is the same or matches one of the one or more stored facial images, determining that the one of the one or more authorization certificates in the received certification data file is valid.

8. The computer-implemented method of claim 7, further comprising:
   determining if the person in the facial image of the person is authorized to have access to the sign-on credentials; and
   if the person in the facial image of the person is authorized to have access to the sign-on credentials, transmitting the sign-on credentials to the computing device to direct the computing device to connect to a wireless access point of the vehicle to obtain access to some or all vehicle information at the computing device.

9. The computer-implemented method of claim 1, wherein the vehicle indicator includes at least one of: a symbol, a character, a number, an optical character recognition symbol, a barcode, or an aircraft trail number.

10. The computer-implemented method of claim 1, wherein the vehicle is an aircraft.

11. A system for wirelessly connecting a computing device to a vehicle, comprising:
   a memory having processor-readable instructions therein; and
   at least one processor configured to access the memory and execute the processor-readable instructions, which when executed by the processor configures the processor to perform a plurality of functions, including functions for:
   receiving a captured image of a vehicle indicator from the computing device;

comparing the captured image of the vehicle indicator with one or more stored images of known vehicle indicators; and when the vehicle indicator of the captured image is the same as or matches one of the known vehicle indicators of the one or more stored images, directing the computing device to connect to a wireless access point of the vehicle to obtain access to some or all vehicle information at the computing device.

12. The system of claim 11, wherein the processor is further configured to perform a plurality of functions comprising:

receiving a login code from the computing device;

identifying a role of a user using the computing device based on the received login code; and retrieving only one or more stored images of known vehicles indicators accessible by the user based on the identified role of the user.

13. The system of claim 12, wherein the comparing the captured image of the vehicle indicator with one or more stored images of known vehicle indicators includes:

comparing the captured image of the vehicle indicator with only the one or more stored images of known vehicle indicators accessible by the user.

14. The system of claim 13, wherein the directing the computing device to connect to a wireless access point of the vehicle to obtain access to some or all vehicle information at the computing device includes:

directing the computing device to connect to a wireless access point of the vehicle to obtain access to only some vehicle information at the computing device based on the identified role of the user.

15. The system of claim 11, wherein the processor is further configured to perform a plurality of functions comprising:

receiving a certification data file from the computing device;

determining if one or more authorization certificates in the received certification data file are valid for connection to the vehicle; and if the one or more authorization certificates in the received certification data file are valid for connection to the vehicle, transmitting sign-on credentials to the computing device to direct the computing device to connect to the wireless access point of the vehicle to obtain access to some or all vehicle information at the computing device.

16. The system of claim 15, wherein at least one of the one or more authorization certificates in the received certification data file is a facial image of a person.

17. The system of claim 16, wherein the determining if the one or more authorization certificates in the received certification data file are valid for connection to the vehicle includes:

comparing the facial image of the person in the received certification data file with one or more stored facial images; and when the facial image of the person in the received certification data file is the same or matches one of the one or more stored facial images, determining that the one of the one or more authorization certificates in the received certification data file is valid.

18. The system of claim 17, wherein the processor is further configured to perform a plurality of functions comprising:

determining if the person in the facial image of the person is authorized to have access to the sign-on credentials; and if the person in the facial image of the person is authorized to have access to the sign-on credentials, transmitting the sign-on credentials to the computing device to direct the computing device to connect to a wireless access point of the vehicle to obtain access to some or all vehicle information at the computing device.

19. A non-transitory computer-readable medium containing instructions for wirelessly connecting a computing device to a vehicle, comprising:

receiving a captured image of a vehicle indicator from the computing device;

comparing the captured image of the vehicle indicator with one or more stored images of known vehicle indicators; and when the vehicle indicator of the captured image is the same as or matches one of the known vehicle indicators of the one or more stored images, directing the computing device to connect to a wireless access point of the vehicle to obtain access to some or all vehicle information at the computing device.

20. The non-transitory computer-readable medium of claim 19, further comprising:

receiving a certification data file from the computing device;

determining if one or more authorization certificates in the received certification data file are valid for connection to the vehicle; and if the one or more authorization certificates in the received certification data file are valid for connection to the vehicle, transmitting sign-on credentials to the computing device to direct the computing device to connect to the wireless access point of the vehicle to obtain access to some or all vehicle information at the computing device.

* * * * *